Figure 1:
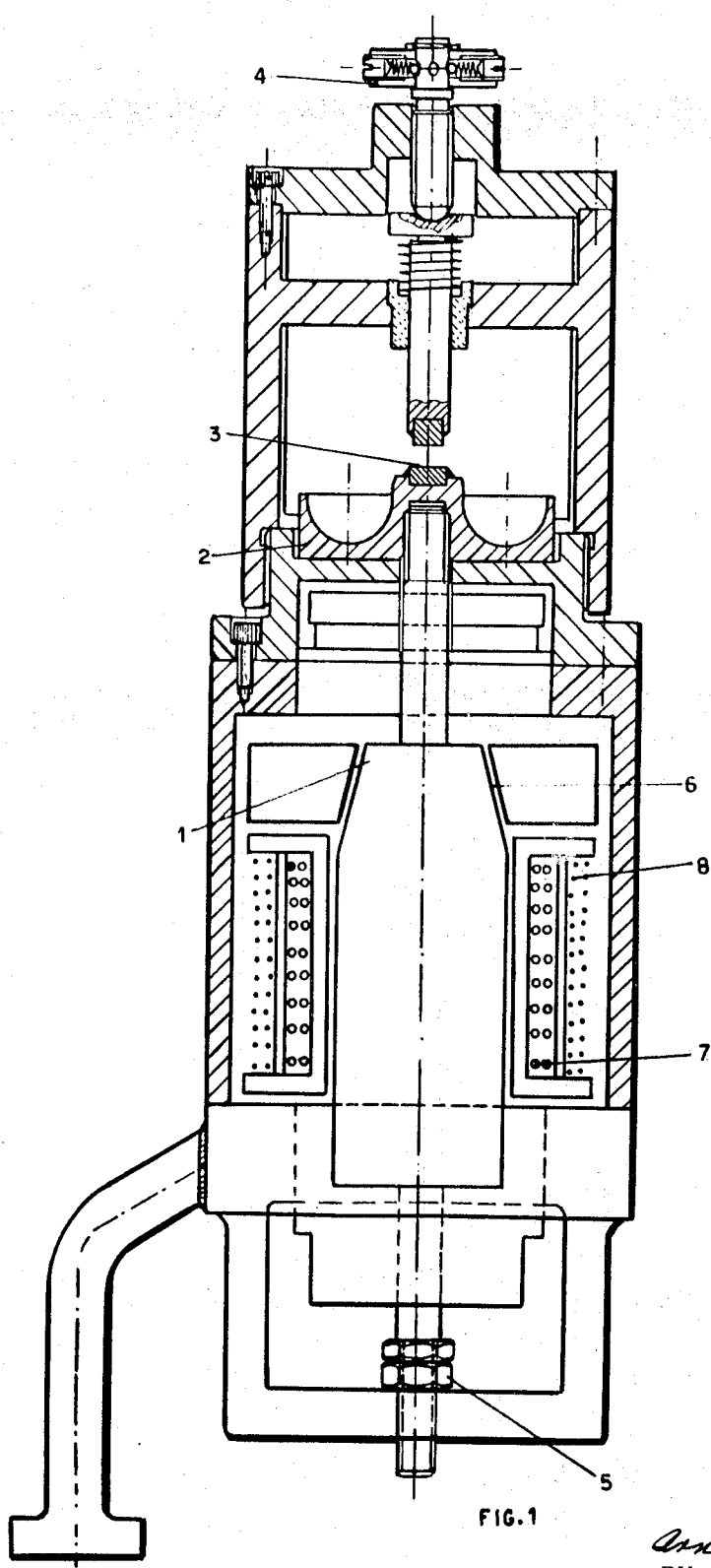

United States Patent [19]
Gambini

[11] 3,771,357
[45] Nov. 13, 1973

[54] APPARATUS FOR DETERMINING THE COMPRESSION STRENGTH OF SPHEROIDAL MATERIAL MADE OF URANIUM, THORIUM AND PLUTONIUM MIXED OXIDES AND THE LIKE

[75] Inventor: Arnaldo Gambini, San Donato Milanese, Italy

[73] Assignee: Snam Progetti S.p.A., San Donato Milanese, Italy

[22] Filed: Dec. 18, 1970

[21] Appl. No.: 99,333

[30] Foreign Application Priority Data
Dec. 19, 1969 Italy .............................. 26021 A/69

[52] U.S. Cl. .................................................... 73/94
[51] Int. Cl. ............................................ G01n 3/08
[58] Field of Search ...................... 73/94, 141 R, 90, 73/95, 141 R, 102

[56] References Cited
UNITED STATES PATENTS

| | | |
|---|---|---|
| 3,541,841 | 11/1970 | Taoka et al ........................ 73/90 |
| 3,610,034 | 10/1971 | Gunn et al ............................. 73/94 |
| 3,127,766 | 4/1964 | Wolle ....................................... 73/95 |
| 3,293,911 | 12/1966 | Ziegler ............................ 73/141 R |

Primary Examiner—James J. Gill
Assistant Examiner—Stephen A. Kreitman
Attorney—Ralph M. Watson

[57] ABSTRACT

An apparatus for automatically determining the compression strength of spheroidal materials comprises an electromagnet having a vertically moving element and adjustment means to provide an air gap, a power winding for exciting the moving element magnetically coupled to a control winding which generates a pulse stopping the exciting current to the power winding when the spheroidal material breaks and means for amplifiying and detecting the pulse generated by the control winding and correlating the value of the excitation current with the compression strength of the sample.

5 Claims, 3 Drawing Figures

APPARATUS FOR DETERMINING THE COMPRESSION STRENGTH OF SPHEROIDAL MATERIAL MADE OF URANIUM, THORIUM AND PLUTONIUM MIXED OXIDES AND THE LIKE

The present invention relates to an apparatus for determining the compression strength of spheroidal material made of uranium, thorium and plutonium mixed oxides and like spheroidal material, of ceramic, ceramic-metal type, hard or brittle presenting however a compression strength.

Some devices for determining the compression strength of spheroidal material are well known in the art; among said devices can be mentioned the ones making use of a lever system with a hydraulic loading and the devices making use of a dynamometric system wherein the dynamometer is charged progressively by means of a screw handwheel.

The first of said systems does not allow the repeatability of the measurements, the immediate measurements can present further some difficulties and laboriousness in the same measurements.

The second type of the above cited systems lacks practicalness, precision, and repeatability of the measurements these latter being carried out by sight and so are strictly subjective. A common drawback of the two said devices is represented further by the complete hand operability of the operations; in fact during the measurements the presence of the operator is necessary and also his continuous attention for reproducing a standard measurement of the process. Hence many errors are present in the measurements these latter being conditioned by the operator reflexes. On the contrary our apparatus, because of its automation, allows measurements more precise, similar, immediate and further for its practicalness is also useful in a glove-box.

The hardness meter of the present invention is of electromagnetic type and constituted by two main parts:

a. electromagnet and its connected parts and an
b. electronic device

This invention is now illustrated in detail with reference to the accompanying figures which represent a preferred embodiment of the invention, given only by way of example.

In FIG. 1 is schematized the electromagnet constituted by a vertical moving element 1 on the upper end of which a working plane is screwed, lightly convex, mounted in an annular container 2 this latter being used for collecting the fragments coming from the spheroidal materials subjected to the compression. The spheroidal materials, whose compression strength is to be determined, are set on the lightly convex sample-holder 3 for allowing a precise centering of the spheroidal material; this latter being subsequently clamped by means of a friction ring 4 the function of which is to permit a precise clamping between the two working planes.

In the lower end of the electromagnet a limit stop has been provided allowing the de-energized electromagnet to have a constant air gap and therefore to plot only one calibration curve for a large series of spheroidal material to be examined. Air gap 6 is kept fixed by means of a nut 5 and a lock nut allowing the starting in each determination from a fixed air gap independently of the diameter of the spheroidal material to be examined. With the same air gap value, the magnetic circuit is constant and the breaking loads, therefore, are mutually correlated.

Two windings have been located around the electromagnet, one of them being a power winding 7 and the other a control winding 8 both being independent electrically but dependent magnetically, as they are wound on the same magnetic circuit. The power winding 7 is fed in d.c. by a saw tooth tension varying from zero to the nominal tension in a prefixed time, allowing in this way to charge progressively the electromagnet and to subject the spheroidal material, to be examined, to the progressive compression, avoiding thereby a violent impact altering the measurement.

The control winding 8 may be replaced by analogous systems such as differential transformer, capacitive, inductive and resistive systems. The relation between the charge expressed in kg. and the dissipated power on the electromagnet is well known in electrotechniques as magneto hold-in force expressed in joule/m $$f = \frac{1}{2} (B^2 S / \mu_o)$$

where
 $B$ represents the magnetic induction
 $S$ represents a surface
 $\mu_o$ represents the absolute permeability of air.
In practice the following formula is used $$f \cong \frac{1}{2}\, 0.8\, B^2\, S\, 10^6$$

wherein the letters have the above cited meanings.

When the excitation current and the flux is allowed to vary the magneto hold-in force varies according to the above cited law.

For carrying out the measurement, according to the device of the present invention, the spheroidal materials are set on the sample holder 3, are clamped by means of a friction ring 4 and subsequently the "start" push-button 14 (FIG. 2) is pressed, allowing thereby the feeding of the power circuit. The electromagnet, charged continuously, starts to compress progressively the spheroidal material to be examined. During this phase the control winding 8 presents a constant electromotive force ($-e = d\phi/dt$), being as it is subjected to a constant flux variation, the increment of the excitation current ($di/dt = K$) on the electromagnet and the air gap being constant.

When the breaking of the spheroidal material occurs, there is a rapid variation of the air gap and therefore under the same excitation current there is a variation of flux, the magnetic resistance of the circuit being reduced; hence it follows that a tension pulse ($-e = d\phi/dt$) overlapped to the E.M.F. is generated on the control winding.

Figure 2:
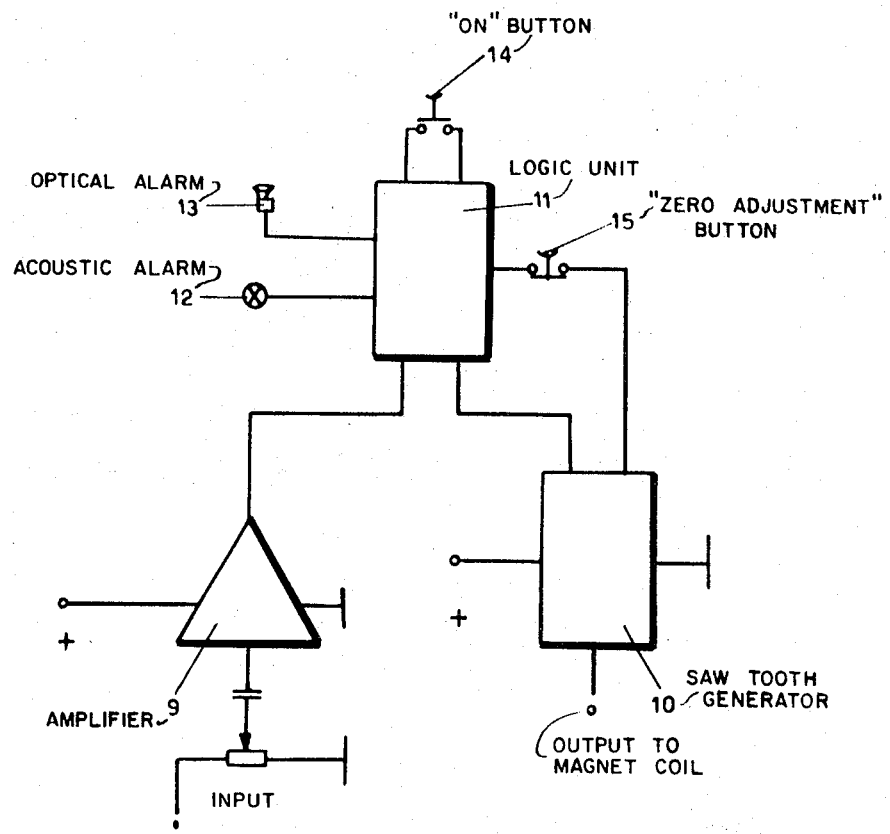

In FIG. 2 is shown an amplification and recording a block diagram constituted by an amplifier 9, a saw tooth generator 10, a logic unit 11, an acoustic and optical alarm device 12 and 13 signalling the occurrence of breaking of the spheroidal material. Two push buttons "on" and "zero adjustment" are indicated by 14 and 15. The voltage pulse generated at the instant of the spheroidal material breaking is amplified by amplifier 9 in FIG. 2, which controls a logic unit 11 which detects the level of the amplified voltage pulse and sends a signal to the actuator 10; this latter stops the increase of saw tooth voltage at the precise instant wherein the breaking of the spheroidal material occurs and therefore the excitation current on the electromagnet stops on the breaking value.

In this case it is possible to read on an ammeter (not shown) the excitation current causing the breaking of the spheroidal material and therefrom, by means of calibration curve, to know the kg. of breaking stress. It is possible to calibrate the scale in kg. and to read in this way the value directly in kg.

Figure 3:
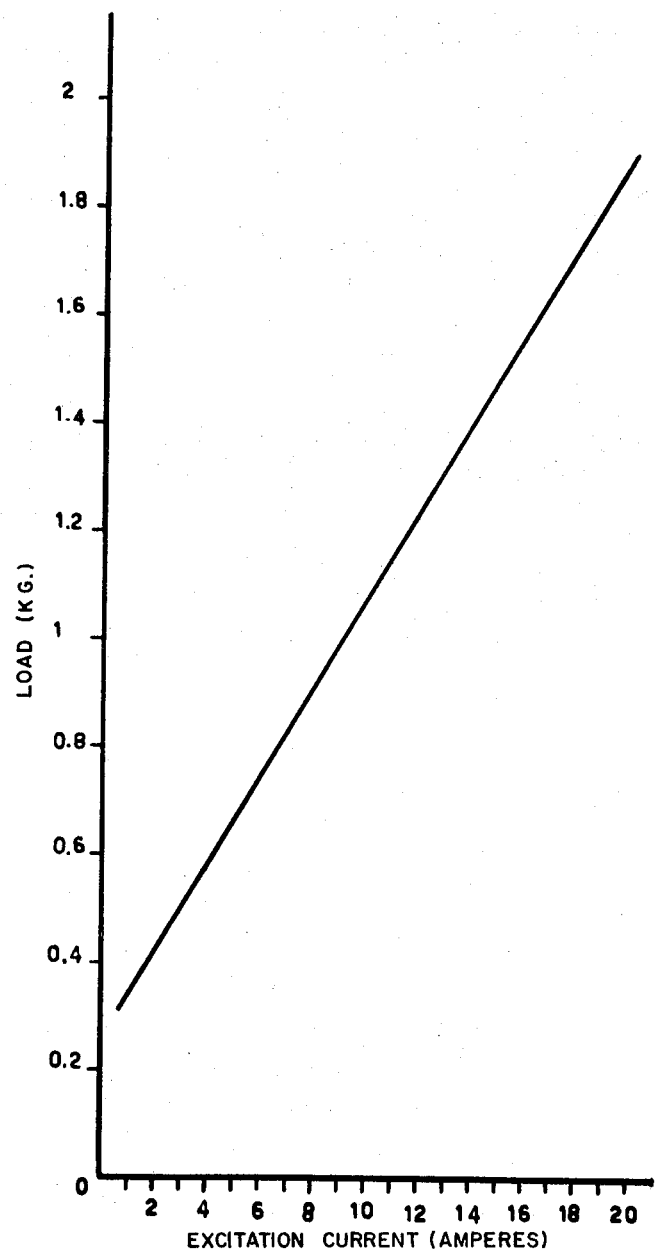

FIG. 3 shows a graph wherein the ordinate represent kg. and abscissae amperes.

Use is made only of the linear of the replay-curve of the electromagnet. The occurred breaking of the spheroidal material is signalled by an acoustic and optical alarm device 12 and 13 in FIG. 2. The excitation current causing the breaking of the spheroidal material is pointed out on the meter until the operator pushes the button 15 "Reset" setting to zero automatically the meter, this latter being ready in this way for a following measurement.

When the mechanical strength of the spheroidal material reaches the maximum stress on the electromagnet, automatic equiment pre-set at a signal corresponding to the maximum stress resets the device to zero and in this way no damage is caused to the device.

Although the present invention has been specified referring to the above-cited realizations, many modifications may be thought without departing from the scope of the present invention.

I claim:

1. Apparatus for determining the compression strength of spheroidal material comprising an electromagnet presenting a vertical moving element with a limit stop in its lower end allowing the de-energized electromagnet to have a constant air gap, two windings magnetically coupled and comprising a power winding for generating a magnetic field for exciting the moving element and a control winding for generating a pulse stopping the excitation current on the breaking value of the spheroidal material, and an ampifier - detector set for amplifying and detecting the pulse resulting from the breaking of spheroidal material, whereby the value of the excitation current permits determination by a suitable calibration curve of the compression strength of the spheroidal material to be examined.

2. Apparatus for determining the compression strength of spheroidal material according to claim 1 wherein the pulse generated by the control circuit is amplified by an amplifier which controls a logic unit driving the actuator; said acutator stopping the increase of saw-tooth voltage and fixing the excitation current on the breaking value.

3. Apparatus for determining the compression strength of spheroidal material according to claim 1 wherein the spheroidal material to be examined is made of uranium, thorium, plutonium, mixed oxides and like spheroidal material, of ceramic, ceramic-metal type, hard or brittle, and having a compression strength.

4. Apparatus for determining the compression strength of spheroidal material, according to claim 1, wherein the spheroidal materials to be examined are placed on a lightly convex working plane, subsequently clamped by a friction ring and the fragments of the material subjected to the compression are collected in an annular container mounted in a working plane.

5. Apparatus for determining the compression strength of spheroidal material according to claim 1 wherein breaking is signalled by an acoustic or optical alarm device and having automatic equipment for setting the apparatus to zero when the mechanical strength of the spheroidal material reaches the maximum stress of the electromagnet without causing any damage to the apparatus.

* * * * *